(12) United States Patent
Ikegaya et al.

(10) Patent No.: US 8,473,709 B2
(45) Date of Patent: Jun. 25, 2013

(54) VIRTUAL VOLUME ALLOCATING UNIT AND METHOD WHICH ALLOCATE A NEW VIRTUAL VOLUME TO ADEQUATELY-SIZED UNUSED VOLUME AREAS

(76) Inventors: Naoko Ikegaya, Sagamihara (JP); Tomoki Sekiguchi, Sagamihara (JP); Keisuke Hatasaki, Kawasaki (JP)

( * ) Notice: Subject to any disclaimer, the term of this patent is extended or adjusted under 35 U.S.C. 154(b) by 7 days.

(21) Appl. No.: 13/232,808

(22) Filed: Sep. 14, 2011

(65) Prior Publication Data

US 2012/0089804 A1     Apr. 12, 2012

(30) Foreign Application Priority Data

Oct. 6, 2010   (JP) ................................. 2010-226151

(51) Int. Cl.
    *G06F 12/00*     (2006.01)
(52) U.S. Cl.
    USPC ........... 711/171; 711/172; 711/170; 711/203; 711/6; 711/156; 711/165; 718/1
(58) Field of Classification Search
    USPC ... 711/171, 172, 170, 203, 6, 156, 165; 718/1
    See application file for complete search history.

(56) References Cited

U.S. PATENT DOCUMENTS

| | | | |
|---|---|---|---|
| 7,653,794 B2 | 1/2010 | Michael et al. | |
| 2008/0244172 A1* | 10/2008 | Kano | 711/112 |
| 2010/0100611 A1 | 4/2010 | Hatasaki et al. | |
| 2011/0055498 A1* | 3/2011 | Kano | 711/156 |
| 2011/0082950 A1* | 4/2011 | Mine et al. | 710/36 |
| 2012/0079226 A1* | 3/2012 | Kihara et al. | 711/165 |
| 2012/0151174 A1* | 6/2012 | Matsunaga et al. | 711/171 |

FOREIGN PATENT DOCUMENTS

| | | |
|---|---|---|
| JP | 2009536762 A | 10/2009 |
| JP | 201097402 A | 4/2010 |

* cited by examiner

*Primary Examiner* — Hong Kim

(57) ABSTRACT

Allocation of virtual disk volumes of a size designated by the computer manager to a virtual computer and accessiblity from the virtual computer to the virtual disk voumes without requiring intervention by a hypervisor are to be achieved. In a computer, at least one virtual computer to be in execution on the computer, and a computer system in which the virtual computer has volumes for holding data, a virtualization mechanism has a virtual volume allocating unit and a virtual volume information supplying unit, and the virtual computer has a virtual volume driver for converting positional information on virtual volumes. Additionally, the virtualization mechanism holds the virtual volume information together with defining information for the virtual computer to which the virtual volumes have been allocated.

20 Claims, 14 Drawing Sheets

VIRTUAL Vol. INFORMATION                              600

| VIRTUAL Vol. | STORAGE DEVICE NUMBER | Vol. NUMBER | PORT NUMBER | SERVER INFORMATION | POSITIONAL INFORMATION | SIZE | VIRTUAL WWN |
|---|---|---|---|---|---|---|---|
| VVOL1 | STR1 | VOL.1 | P1 | SRV1 | BLK5 | 20 | WWN1 |
| VVOL32 | STR1 | VOL.2 | P1 | SRV1 | BLK5 | 20 | WWN3 |
| VVOL31 | STR1 | VOL.2 | P1 | SRV1 | BLK3 | 20 | WWN2 |
| VVOL4 | STR1 | VOL.3 | P2 | SRV1 | START | 100 | WWN4 |
| 610 | 620 | 630 | 640 | 650 | 660 | 670 | 680 |

FIG.4

VOLUME MANAGEMENT INFORMATION 400

| STORAGE DEVICE NUMBER | Vol. NUMBER | PORT NUMBER | STATUS OF USE | POSITIONAL INFORMATION | SIZE |
|---|---|---|---|---|---|
| STR1 | VOL.1 | P1 | UNOCCUPIED | — | 80 |
|  |  |  | WWN1 VVOL1 | BLK1 | 20 |
| STR1 | VOL.2 | P1 | UNOCCUPIED | — | 100 |
| STR1 | VOL.3 | P2 | UNOCCUPIED | — | 100 |
| STR1 | VOL.4 | P2 | WWN3 VVOL4 | START | 100 |

410  420  430  440  450  460

Vol.3 MANAGEMENT INFORMATION AFTER ALLOCATION OF VVOL3  401

| STR1 | VOL.3 | P2 | UNOCCUPIED | — | 60 |
|---|---|---|---|---|---|
|  |  |  | WWN1 VVOL31 | BLK5 | 20 |
|  |  |  | WWN1 VVOL32 | BLK3 | 20 |

FIG.6

VIRTUAL Vol. INFORMATION 600

| VIRTUAL Vol. | STORAGE DEVICE NUMBER | Vol. NUMBER | PORT NUMBER | SERVER INFORMATION | POSITIONAL INFORMATION | SIZE | VIRTUAL WWN |
|---|---|---|---|---|---|---|---|
| VVOL1 | STR1 | VOL.1 | P1 | SRV1 | BLK5 | 20 | WWN1 |
| VVOL32 | STR1 | VOL.2 | P1 | SRV1 | BLK5 | 20 | WWN3 |
| VVOL31 | STR1 | VOL.2 | P1 | SRV1 | BLK3 | 20 | WWN2 |
| VVOL4 | STR1 | VOL.3 | P2 | SRV1 | START | 100 | WWN4 |
| 610 | 620 | 630 | 640 | 650 | 660 | 670 | 680 |

VIRTUAL VOLUME ALLOCATING UNIT AND METHOD WHICH ALLOCATE A NEW VIRTUAL VOLUME TO ADEQUATELY-SIZED UNUSED VOLUME AREAS

CROSS REFERENCE TO RELATED APPLICATIONS

This application claims priority to and the benefit of Japanese Patent Application No. 2010-226151 filed Oct. 6, 2010, the disclosure of which is incorporated herein by reference.

TECHNICAL FIELD

The present invention relates to a computer system for executing virtual computer functions, and more particularly to a volume allocating method for allocating areas in disk volumes in a virtual computer.

BACKGROUND

Virtualization technology by which multiple tasks are integrated permits enhancement of the utilization efficiency of hardware resources including a processor, a memory, input/output units and the like. However, in architecting and restructuring a computer system, the requirements of the storage which the server manager desires to connect are notified to the storage manager, who executes the task to set a storage meeting those requirements. Since virtualization technology has made possible flexible architecting of a virtual server, it is desirable also to reduce the time taken to set the storage to be used by the virtual manager.

As a related art for realizing this desire, the Japanese Unexamined Patent Application No. 2010-97402 discloses a technique which dispenses with intervention by either the manager of storages to be connected to the server computer or the storage managing server. Thus, multiple disk volumes are made ready in the storage, and a dummy interface identifier is allocated to each disk volume in advance. The interface identifier may be, for instance, a World Wide Name (WWN) for host bus adapters (HBA) for use in identifying the host that can access the disk volume. By selecting an unused disk volume at the time of setting the virtual server and setting the WWN of the virtual HBA of the virtual server to replace the WWN allocated there, the virtual server and the disk volume to be allocated to it can be set at the same time.

Meanwhile, the Japanese Translation of Unexamined PCT Application No. 2009-536762 discloses a technique by which a disk volume of a physical computer is converted into virtual hardware of the host computer while the physical computer is in execution. A snapshot consistent with the file system of the physical computer is created, and transferred to a virtual hard disk file mounted on the host computer. Next, after so modifying information on actions related to the virtual hard disk file and operating system that they can function to boot the virtual computer with the host computer, the virtual hard disk file is unmounted from the host computer and used as a new disk volume for the virtual computer. There is a virtual disk file that causes an area managed by the host computer to appear to the virtual computer as a disk volume and the virtual computer to access the disk volume via the host computer. Here, the host computer can as well be deemed to have a function equivalent to that of a hypervisor (virtualization mechanism).

SUMMARY

The technique disclosed in the Japanese Unexamined Patent Application No. 2010-97402, as it selects from multiple disk volumes made ready in advance an unused one of a capacity appropriate for the virtual computer and allocates it to the virtual computer, dispenses with intervention by the manager of storages matched with the virtual computer architecture, and can thereby serve to reduce the man-hours and time taken by virtual computer architecting.

However, as it requires estimation of the number of disk volumes to be used by the virtual computer to be architected subsequently and the availability of a sufficient number of disk volumes for that estimated requirement, a large number of disk volumes should be set.

Furthermore, the disk capacity which a virtual computer is anticipated to require is diverse depending on the tasks to be accomplished by the virtual computer, but it is impossible to make ready in advance disk volumes of sizes suitable for all the possible future tasks. Should a sufficient number of disk volumes of a sufficient diversity be made ready for any future requirement, the virtual computer would have to be burdened with so many disk volumes standing by for allocation.

On the other hand, the system disclosed in the Japanese Translation of Unexamined PCT Application No. 2009-536762, namely the system in which the host computer generates a virtual hard disk file of a capacity required for the virtual computer and the virtual computer is let use the file as disk volumes, an access request should be delivered to the host computer when the virtual computer is to access a disk volume. The workload on the host computer increases, with a possible adverse impact on the efficiency of operation, because the host computer coverts the forms and positions of the disk volume and the virtual hard disk file.

This system thus involves the problem of difficulty to quickly make ready disk volumes whose capacity is suitable for the purpose of use and moreover whose performance is satisfactory for the virtual computer to be architected.

An object of the present invention is to provide a computer system that allows, without having to make ready disk volumes in advance for each individual virtual computer, a disk volume of a required size to be selected and divided at the time of generating the virtual computer and to be allocated to the virtual computer.

In order to achieve the object stated above, a volume allocating method for allocating areas in disk volumes in a virtual computer and a computer system using this method according to one aspect of the invention is provided with a computer and a storage device connected to the computer, wherein the storage device has a volume for storing data of the computer and virtual volumes formed by logically dividing the volume, and the computer has an arithmetic unit, a memory unit, a virtual computer operating on the arithmetic unit under the control of a virtualization mechanism, and volume management information for managing the status of use of the virtual volume and positional information on the virtual volume. The virtualization mechanism has a virtual volume allocating unit that allocates a new virtual volume to the virtual computer when a request for virtual volume allocation is received, and the memory unit has virtual volume information for managing virtual volumes allocated to the virtual computer. The virtual volume allocating unit, referencing the volume management information, searches for any unused area in the volume, allocates a new virtual volume to an unused area in the volume if the unused area of the volume satisfies the size requirement for the virtual volume designated by the request for virtual volume allocation, updates the status of use of the virtual volume and positional information on the virtual volume that the volume management information has to a state after the allocation of the new virtual volume, and adds information on the new virtual volume to the virtual volume information.

The invention, as a computer manages virtual volumes formed by logically dividing the volume of the storage device and a virtualization mechanism allocates a new virtual volume on the basis of virtual volume management information, makes possible allocation of virtual disk volumes of a size designated by a server manager or the like to the virtual computer at the required timing.

Also the invention, as the computer has a virtual volume driver for accessing virtual volumes and the virtual volume driver converts the access addresses on the virtual volumes to access addresses on the volume, makes possible accessing from the virtual computer to virtual disk volumes without requiring intervention by a hypervisor, resulting in faster access processing.

BRIEF DESCRIPTION OF THE SEVERAL VIEWS OF THE DRAWINGS

These and other features of the present invention will become more apparent from the following detailed description when taken in conjunction with the accompanying drawings, wherein:

FIG. 4 shows the data structure of information for managing volumes;
FIG. 6 shows the data structure of information for managing the virtual volume.

DETAILED DESCRIPTION

First Embodiment

A first embodiment of the present invention will now be described. This first embodiment is a system including a virtualization mechanism and a storage device, and the configuration of the system in which, and a method by which, the virtualization mechanism allocates a virtual volume to a virtual computer (VM) and, in collaboration with a virtual volume driver, accesses the virtual volume.

Figure 1:
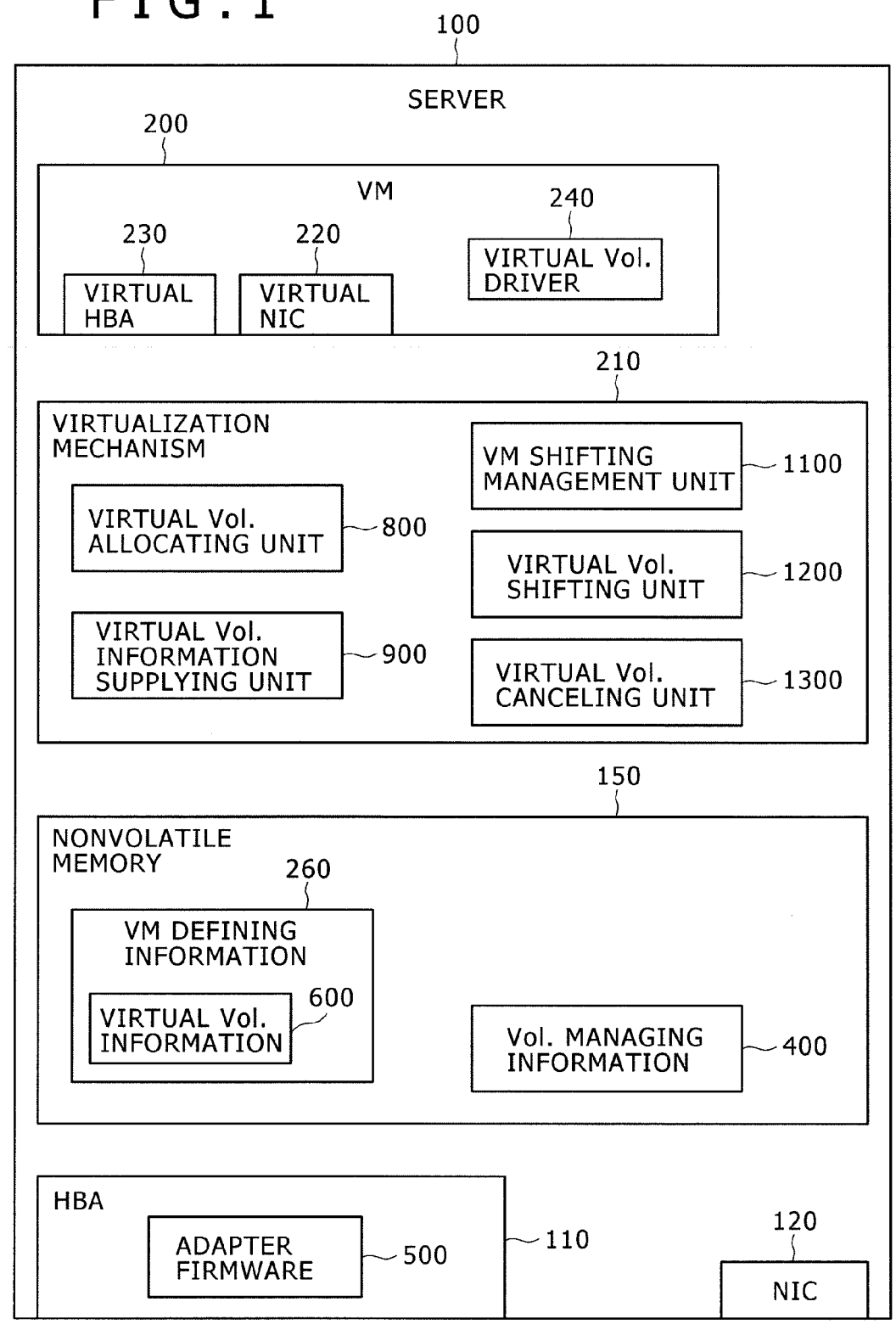
FIG. 1 shows constituent elements of a server.

FIG. 1 shows constituent elements of a server in the first embodiment of the invention.

A server 100, which is a physical computer of a usual configuration, is connected to outside by a host bus adapter (HBA) 110 of a fiber channel and a network interface card (NIC) 120. Data is held in a nonvolatile memory 150.

In the server 100, a virtualization mechanism 210 to realize server virtualization operates and a VM 200 performs on the virtualization mechanism 210. The VM 200 has a virtual NIC 220, which is a virtual NIC configured by the virtualization mechanism 210, and a virtual HBA 230, which is a virtual HBA. An intrinsic MAC address is assigned to a port of the virtual NIC 220. Further, an intrinsic WWN is assigned to a port of the virtual HBA 230. The WWN and the MAC address are used as intrinsic information to identify the virtual adapter of the virtual computer from an external apparatus.

Figure 2:
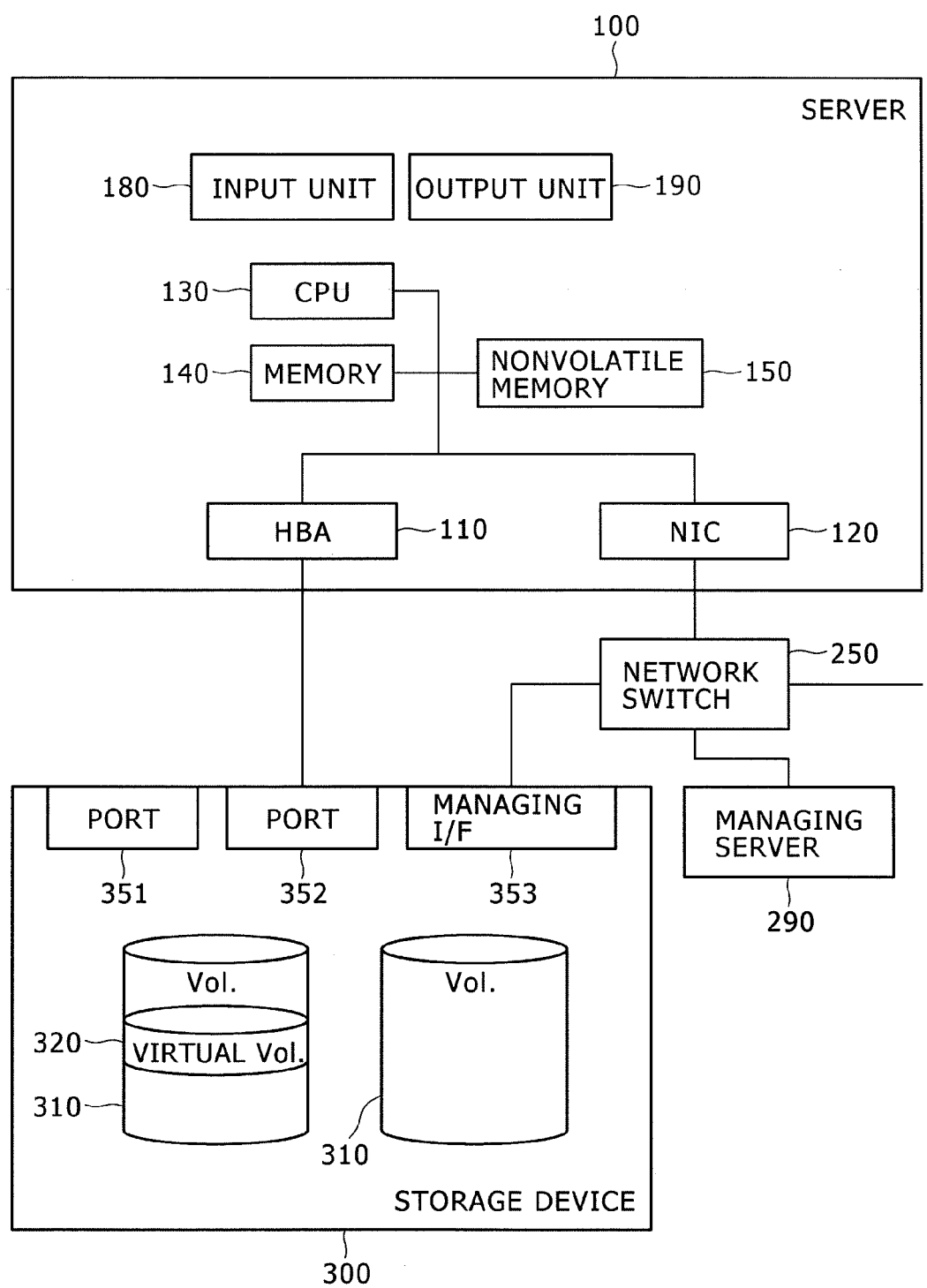
FIG. 2 shows the configuration of a computer system.

FIG. 2 shows the system configuration. This system comprises the server 100, a storage device 300, a network switch 250 and a managing server 290.

The server 100 comprises an input unit 180 for accepting data, an output unit 190 for outputting the status of the physical computer and the result of program execution, a memory 140 for holding task processing programs and data and a CPU 130 for executing programs of the virtualization mechanism and application programs among others read into the memory 140 in addition to the HBA 110, the NIC 120 and the nonvolatile memory 150 shown in FIG. 1, and is connected via a bus. A blade in a blade system can as well be used for the server 100.

The storage device 300 has a port 351 and a port 352, which are connected from the server 100 via the HBA 110. It also has volumes 310 for storing data of the server 100; the volumes 310 are usually logical units (LU) made redundant by combining multiple physical disk devices. It further has a managing interface 353 to make possible communication with the managing server 290 via the network 250. The managing server 290 is a server that executes the functions of server managing tools and storage managing tools. Incidentally, the storage device 300 may as well be within the server 100.

Figure 3:
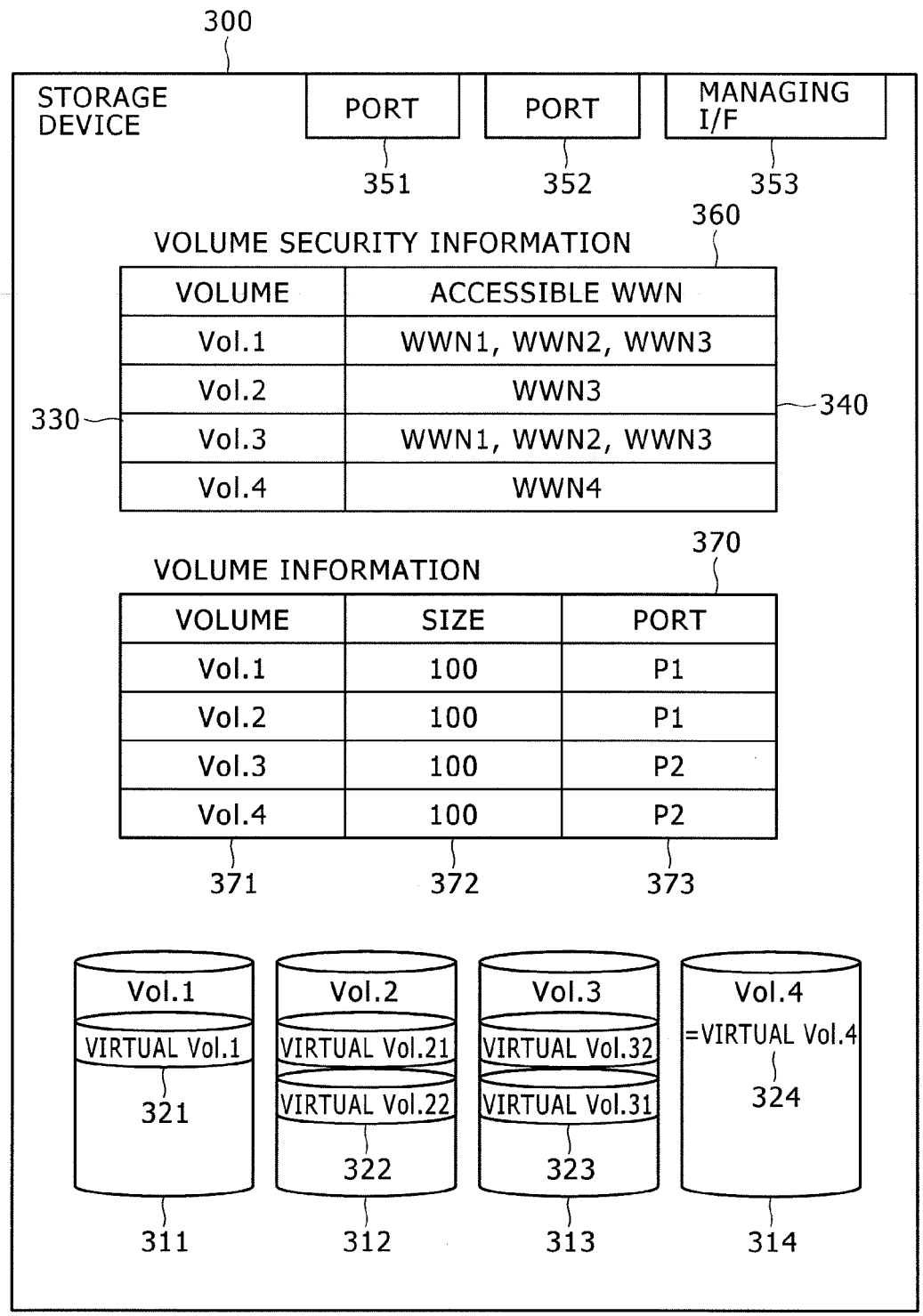
FIG. 3 shows constituent elements of a storage device.

The storage device 300 will now be described in detail with reference to constituent elements shown in FIG. 3.

Volume security information 360 is a set of volume fields 330 and accessible WWN fields 340. The volume security is intended to prevent the system's own server from being accessed from a port of another unauthorized server in a storage area network (SAN) or the like. The volume security information 360 is registered by the storage manager on the basis of information indicated through a storage managing interface.

For instance, if the server is to access a volume 311 and a volume 313, the WWN of the HBA's port should be "WWN1", "WWN2" or "WWN3". Similarly, for accessing a volume 312, the WWN should be "WWN3", or for accessing a volume 314, the WWN should be "WWN4".

At the time of decision by the server to use any of the volumes 311 through 314, each corresponding WWN should be set and, in order to set a value on volume security information 320, it is usual to use a storage managing tool from the managing server 290. It is also possible to perform setting by operating a storage managing tool on the server 100.

In this embodiment, the virtualization mechanism 210 allocates internal areas in the volumes 311 through 314 to the VM 200 as virtual volumes 321 through 324. In accordance with the volume security information 360, in the volumes 311 and 313, the virtual volume 321 is accessible from the VM 200 in the port of whose virtual HBA 230 "WWN1", "WWN2" or "WWN3" is set. On the other hand, in the volume 312, the virtual volume 322 is accessible from the VM 200 in the port of whose virtual HBA 230 "WWN3" is set. As only one WWN is accessible in this case, only one VM can allocate the virtual volume 322 to the volume 314. Similarly in the volume 314, the virtual volume 322 is accessible from the VM 200 in the port of whose virtual HBA 230 "WWN4" is set. In the case shown here, it is not that the internal area of the volume 314 is subdivided and multiple virtual volumes 324 are set, but that the volume 314 is used as it is as the virtual volume 324.

The storage device 300 also has volume information 370, which has a volume field 371, a size field 372 and a port field 373. At the time the managing interface 353 requests volume generation, the storage device generates the volumes 311 through 314, and registers the identifiers of the volumes in the field 371, the sizes in the field 372 and the identifiers of the ports via which an access within the storage device is made in the field 373.

For this allocation of the internal areas of volumes in the storage device to the VM as the virtual volume, there are a virtual volume allocating unit 800 and a virtual volume information supplying unit 900 in the virtualization mechanism 210.

Hereupon, the procedure in which the virtualization mechanism 210 allocates the internal area of a volume of the storage device to the VM as a virtual volume.

Figure 8:
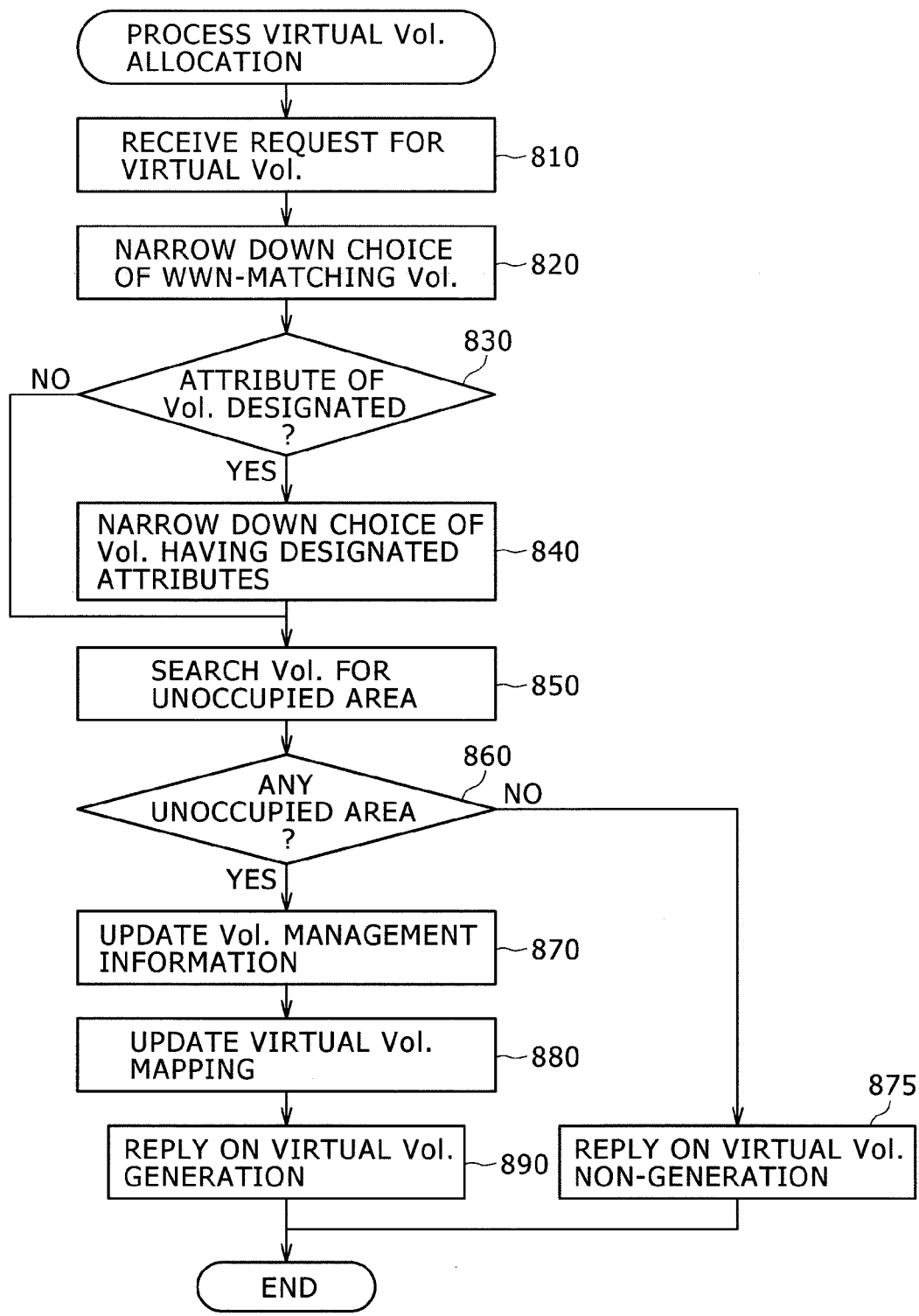
FIG. 8 is a flow chart showing a procedure in which a virtualization mechanism allocates a virtual volume to a virtual computer.

FIG. 8 is a flow chart showing the actions of the virtual volume allocating unit 800 of the virtualization mechanism 210.

At Step 810, a request for virtual volume allocation to the VM 200 is received. The request source is the input unit 180 or the managing server 290. The size of the virtual volume is also accepted here. Further, such information items as the redundancy level representing the reliability of the volume and whether or not the whole volume is to be allocated or not can be accepted in addition as the attribute of the virtual volume.

Then at Step 820, the choice of volume accessible from the VM 200 out of the volumes in the storage device 300 is narrowed down by using volume management information 400 shown in FIG. 4.

To describe the volume management information 400 hereupon, it is a table for managing volumes in the storage device. The volume management information 400 is prepared on the memory 140 by the virtualization mechanism 210, and stored in the nonvolatile memory 150. Information items in fields 410 through 430 and 460 are acquired when the virtualization mechanism 210 addresses an inquiry from the managing interface 353 to the storage device 300 about the volume information 370 by using a request command from the managing server 290. The initial values of fields 440 and 450 indicate that no virtual volume is allocated.

In the storage device number field 410, information to identify the storage device 300 is stored. In the volume number field 420, information to identify a volume in the storage device 300 is stored. In the port number field 430, information to specify a port on an access path to the volume is stored. If no virtual volume is allocated, information indicating the fact of being unoccupied is held. When a virtual volume has been allocated, information to identify the virtual volume is stored, an entry is added to the volume management information 400, positional information on the virtual volume is stored into the positional information field 450, and the size of the virtual volume is stored into the size field 460. In the size field 460, the volume size is stored when the status of use field 440 indicates "Unoccupied" and, when a virtual volume has been allocated, the entry is changed to a value that is smaller by the size of the allocated volume.

To narrow down the choice of volume accessible at Step 820 described above, every volume registered in the volume management information 400 is checked for accessible WWN registered in the volume security information 360. Then, the virtual HBA 230 of the VM 200 extracts a volume whose WWN to be used is registered in the field 340.

Next at Step 830, it is determined whether or not any attribute of the volume to which the virtual volume is to be allocated is required in the virtual volume request command at Step 810. In other words, the question is whether the character of the volume is designated or the whole volume is designated at Step 810. If it is determined that any attribute is designated, the processing moves on to Step 840. Or, if the absence of attribute designation is determined, the processing advances to Step 850.

At Step 840, the attribute of the volume extracted at Step 820 is checked, and the choice is narrowed down to only those volumes satisfying the designated attribute requirements. If the redundancy level of the volume is designated as the required attribute, the virtualization mechanism 210 inquires at the storage device 300 or the management server 290 as to the redundancy level of the volume. If the virtualization mechanism 210 has on hand the required attribute of the volume in advance, narrowing down can be processed more rapidly.

Then at Step 850, the unoccupied area in the focused-on volume is searched for. To accomplish this processing, the value of the size field 460 matching the focused-on volume is determined by using the volume management information 400.

At Step 860, a volume having a sufficiently large unoccupied area is selected. If more than one such volume is found, choice is narrowed down to one of them. The conditions of narrowing-down to be applied include the smallness of the number of already allocated virtual volumes, the largeness of the unoccupied area size and the absence of division of the unoccupied area into many non-continuous areas. If a volume having a sufficiently large unoccupied area is found, the processing moves on to Step 870. Or if it is determined that there is no volume satisfying the conditions, the processing advanced to Step 875 and a report of failure to generate a virtual volume is returned to the requester.

At Step 870, the volume management information 400 is updated. To add here information on the newly generated virtual volume, information for identifying the new virtual volume is added to the status of use field 440 matching the storage device number field 410 in which the volume to be generated has been registered, the leading position of the virtual volume within the volume is added to the positional information field 450, and the capacity of the virtual volume is added to the size field 460. As the generation of the virtual volume has made the unoccupied capacity of the volume smaller, the value of the size field 460 matching "Unoccupied" in the status of use field 440 is reduced. If the virtual volume is divided into multiple partitions, the fields 450 and 460 are registered as multiple entries. For instance, the entry of the volume 313 in the updated volume management information 400 where a virtual volume 323 is to be allocated to the volume 313 is shown in information 401 in FIG. 4. Here is shown a case in which a virtual volume 31 of a size 20 represented by a leading position block BLK5 and a virtual volume 32 of the size 20 represented by a leading position block BLK3 are allocated, and the unoccupied area has been reduced to a size 60.

Then at Step 880, virtual volume information 600 shown in FIG. 6 is updated by adding an entry on the newly generated virtual volume information.

The virtual volume information 600 will be described hereupon. The virtual volume information 600 is a table that is generated by the virtualization mechanism 210 on the memory 140 and manages the virtual volume of the VM 200 saved together with VM defining information 260 on the nonvolatile memory 150. Further, virtual volume information 600', which is a copy of the virtual volume information 600, is also placed in adapter firmware 500 within the HBA 110.

In a virtual volume field 610, information for identification of virtual volumes by the VM 200 is stored. In a storage device number field 620, information for identification of storage devices 300 is stored. In a volume number field 630, information for identification of volumes in each storage device 300 is stored. In a port number field 640, information for specification of a port on an access path to the volume is stored. In a server information field 650, information for specification of the virtualization mechanism 210 to which a virtual volume has been allocated is stored. To facilitate acceptance of any subsequent inquiry from another server regarding information for identification of the virtualization mechanism 210, an Internet address is used here. In a positional information field 660, positional information on virtual volumes is stored, and in a size field 670, sizes of virtual volumes are stored. Where virtual volumes are allocated to two or more non-continuous areas, information on as many areas as those in the positional information field 660 and the size field 670 is stored. In a WWN field 680, the value of the virtual WWN allocated to the virtual HBA 230 that is to access the virtual volume is stored.

Finally at Step 890, the requester is notified of the completion of allocation of virtual volumes to the VM 200.

As described so far, in the server of First Embodiment as the virtualization mechanism 210 has the volume management information 400 for managing volumes within storage devices and the used/unused (unoccupied) areas and the sizes of the volumes 311, 312, 313 and 314 are managed in accordance with this the volume management information 400, the virtualization mechanism 210 having received a request for virtual volume allocation to the VM 200 references the volume management information 400 and can thereby find an unused (unoccupied) area satisfying the conditions of the request, thereby making possible allocation of a virtual volume to the VM 200.

Figure 9:
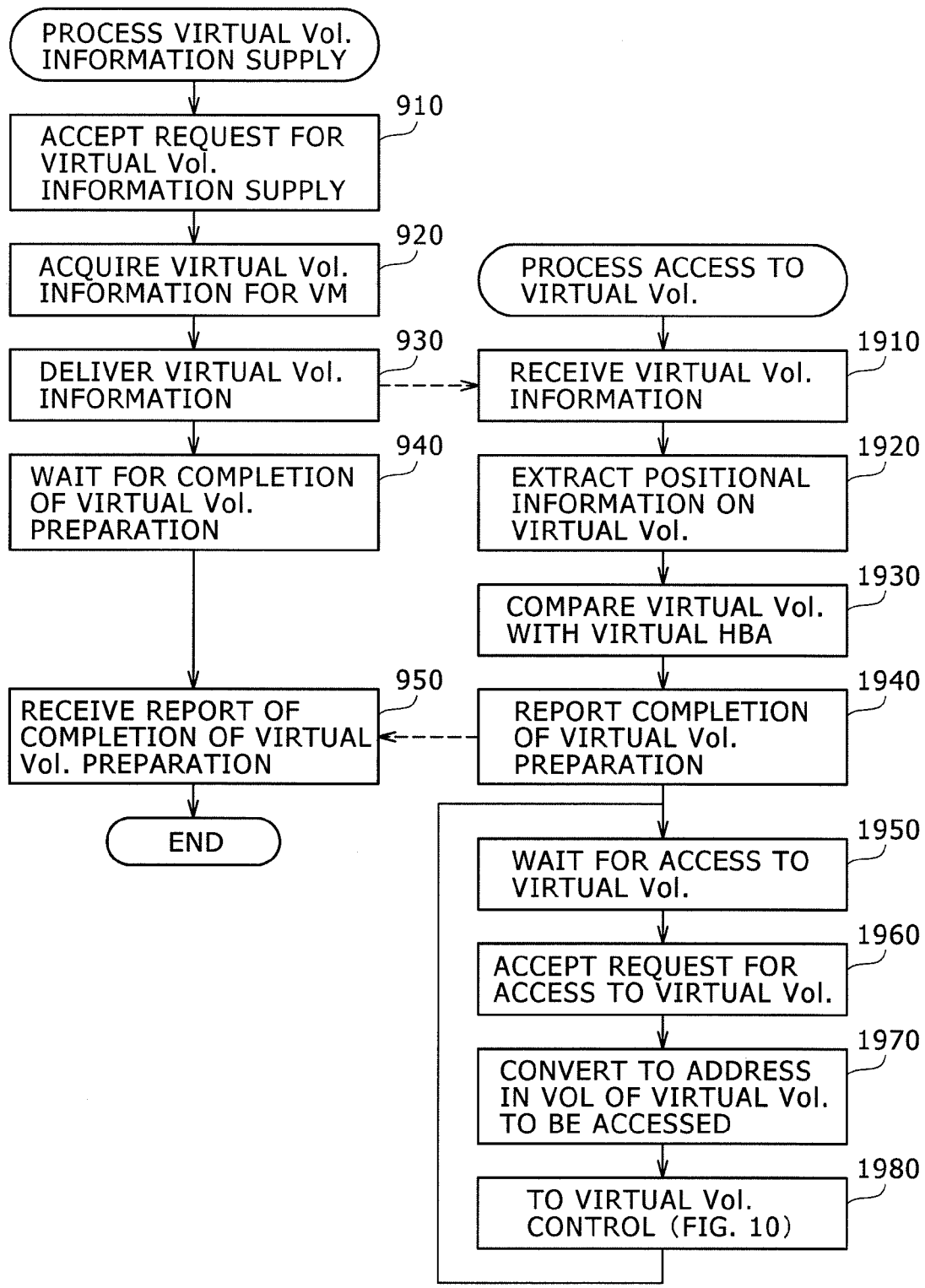
FIG. 9 is a flow chart showing a procedure of converting a virtual volume access into a volume access.

Next, the procedure for accessing a virtual volume from the VM 200 will be described. FIG. 9 is a flow chart showing actions of the virtual volume information supplying unit 900 of the virtualization mechanism 210 and the virtual volume driver 240 on the VM 200.

At Step 910, the virtual volume information supplying unit 900 accepts a request for transmission of virtual volume information to the VM 200. The requester may be the input unit 180, the managing server 290 or the virtualization mechanism 210 executing actuation of the VM 200.

Then at Step 920, virtual volume information for the VM 200 is acquired from the virtual volume information 600 in the nonvolatile memory 150.

Next at Step 930, the virtual volume information 600 is delivered to the virtual volume driver 240, and at Step 940 the processing waits for completion of virtual volume preparation by the virtual volume driver 240.

The virtual volume driver 240, when it accepts the virtual volume information 600 at Step 1910, extracts positional information on each virtual volume at Step 1920.

Then at Step 1930, a virtual WWN 680 matched with a virtual volume, so as to make it information to specify the data block to be accessed with a volume in the storage device when a request for access is issued to a volume in the virtual volume driver 240, matches the allocated virtual HBA 230 with the virtual volume and stores it.

To add, if the virtual volume comprises partitions of multiple non-continuous areas at Step 1920 above, the leading position and the size may as well be managed partition by partition.

Next at Step 1940, the virtual volume driver 240 gives a reply to the virtual volume information supplying unit 900 of the virtualization mechanism 210 that preparations for an access to the virtual volume are ready.

The virtual volume information supplying unit 900, upon receiving the report from Step 1940 at Step 950, ends the processing.

Meanwhile, the virtual volume driver 240 at Step 1950 waits for an access to the virtual volume from a program on the VM 200.

Figure 14:
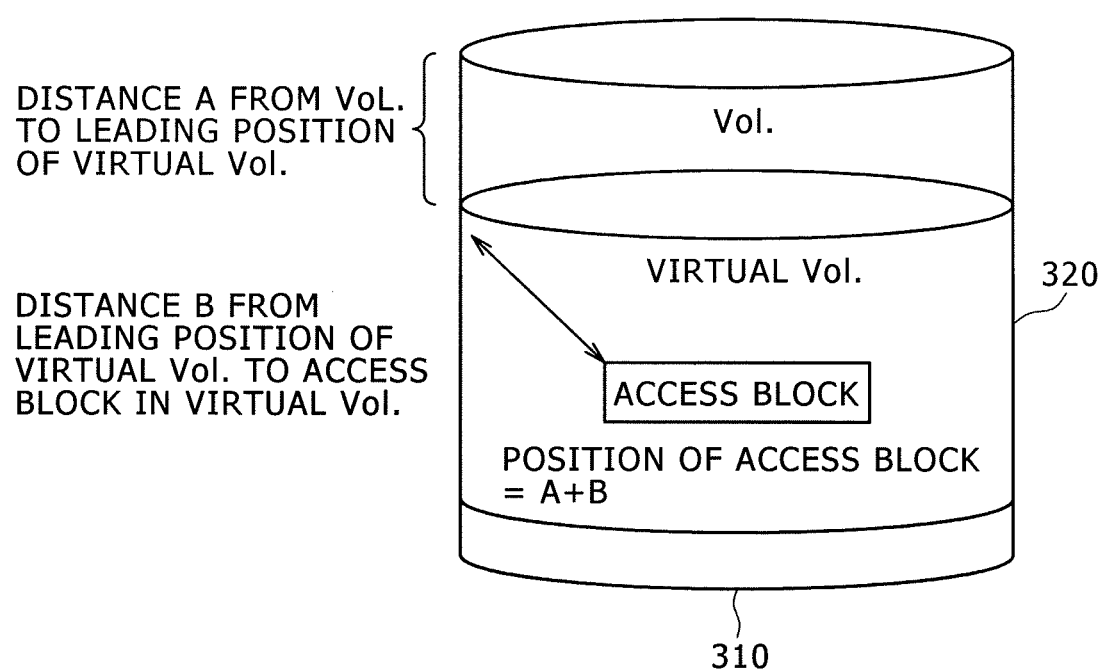
FIG. 14 shows conversion from the access of a virtual volume to the access destination of the volume.

If a request for an access to the virtual volume is received at Step 1960, positional information on the virtual volume is converted into positional information on an area on the volume at Step 1970. FIG. 14 shows a method of calculation for conversion into an address on the volume. Thus, the sum of the distance from the leading position of the volume to that of the virtual volume and the distance from the leading position of the virtual volume to the access block within the virtual volume is the position of the access block within the volume. If the virtual volume comprises partitions of multiple non-continuous areas, the leading position of the virtual volume and the size of each partition are matched. If one access to the virtual volume is to cover multiple partitions, the number of accesses is increased to that of partitions.

To add, if the request for a virtual volume access received at Step 1960 is boot processing from a virtual volume, the leading position of the area in which the virtual volume is allocated is converted into an access request at Step 1970.

Finally at Step 1980, the processing is handed over to a Virtual volume controller 1000 in the adapter firmware 500.

Now it is ready to permit accessing to the volume to which the virtual volume has been allocated from the VM 200. To add, the processing of the virtual volume driver 240 may as well be executed by the adapter firmware 500 of the HBA 110.

Figure 10:
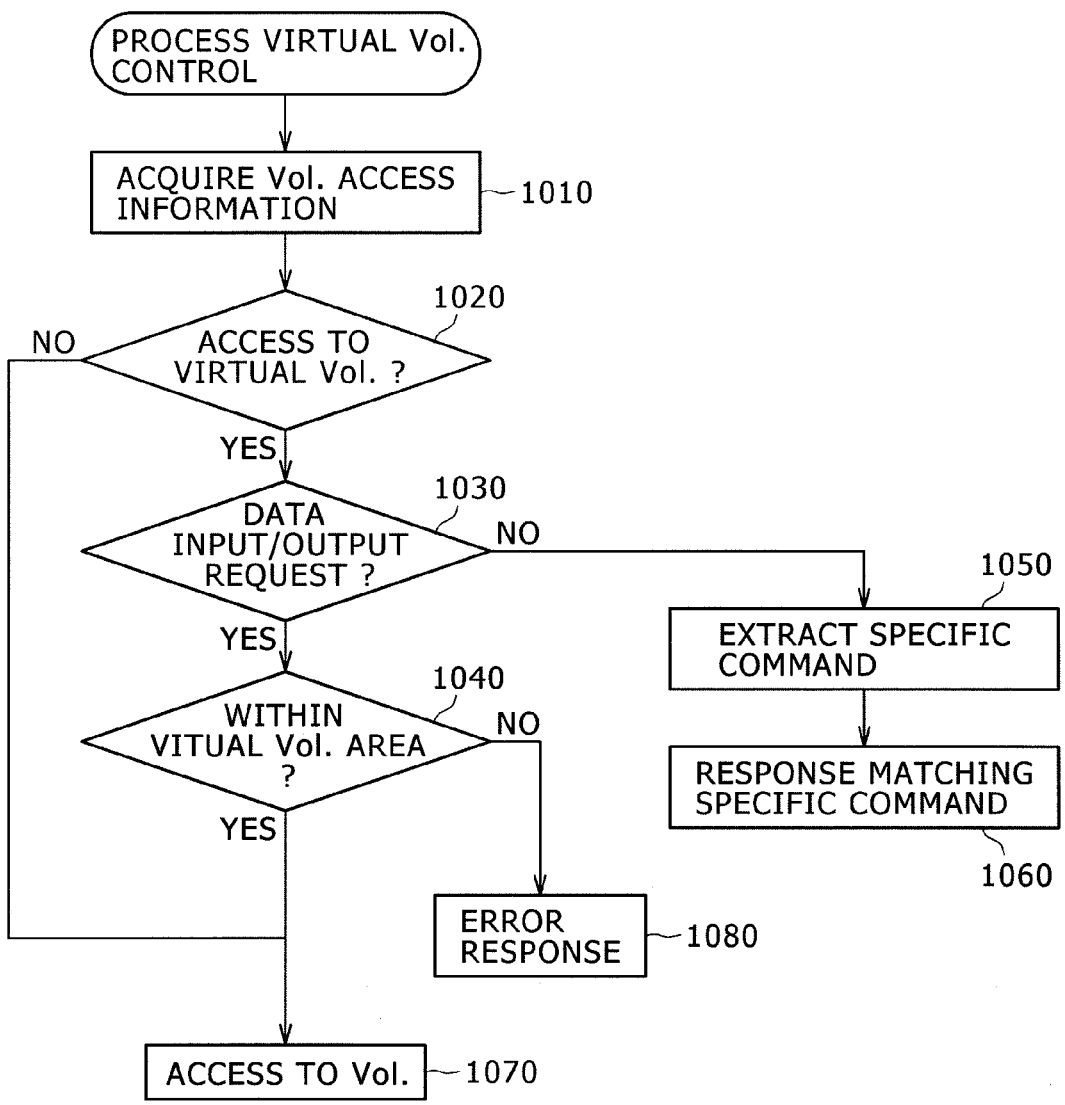
FIG. 10 is a flow chart showing a procedure of controlling a virtual volume.

Next, the procedure of controlling accesses to virtual volumes will be described. FIG. 10 is a flow chart showing the actions of the Virtual volume controller 1000 in the adapter firmware 500 of the HBA 110.

At Step 1010, the virtual volume controller 1000 acquires volume information on the access destination from the virtual volume driver 240 having received a request for accessing a virtual volume from a program on the VM 200. The volume information to be acquired here comprises information for identifying the volume and a command indicating the accessing method.

Then at Step 1020, it is determined whether or not the volume of the access destination is the volume to which a virtual volume has been allocated. This determination uses the virtual volume information 600' in the adapter firmware 500. If it is determined here that the volume is not one for the virtual volume, the processing advances to Step 1070, where volume accessing is executed as a normal volume access without determining whether or not it is an access by any specific command or locating the access area. If the access is determined at Step 1020 to be an access to a volume for a virtual volume, the processing goes ahead to Step 1030.

At Step 1030, it is determined whether or not the instruction indicating the accessing method is a request for data input/output. This determination uses specific command control information 510 in the adapter firmware 500.

Figure 5:
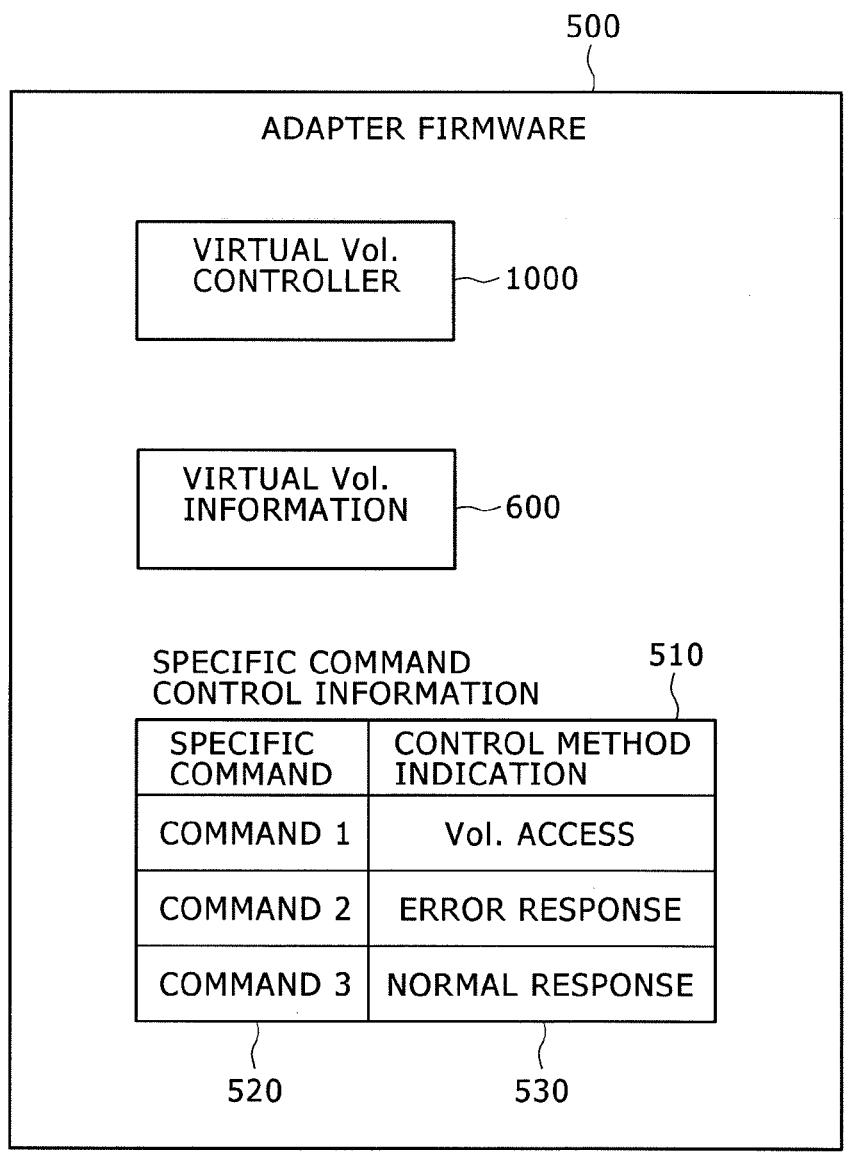
FIG. 5 shows constituent elements of adapter firmware.

Hereupon, the specific command control information 510 will be described with reference to FIG. 5. The specific command control information 510, which is an information table internally generated and held by the adapter firmware 500, comprises a specific command field 520 and a control method indication field 530. In the control method indication field 530 corresponding to Command 1 in the command field 520, accessibility to a volume in the storage device 300 is registered. Command 1 is, for instance, an output command to a volume.

In the control method indication field 530 corresponding to Command 2 in the command field 520, a command to reply an error of impossibility to execute is registered. Command 2 is, for instance, a lock command for exclusive control of volumes.

In the control method indication field 530 corresponding to Command 3 in the command field 520, a normal response without accessing any volume is registered.

If it is determined at Step 1030 that the accessing method is what is indicated by Command 1 of the specific command control information 510, the processing goes ahead to Step 1040.

At Step 1040, it is determined whether or not the area to access the volume is within the virtual volume matching a virtual WWN of the VM 200 that is attempting the access. This determination uses the virtual volume information 600' in the adapter firmware 500. Further, the size of the data to be accessed and the area size of the virtual volume are compared to check whether or not the data to be accessed can be wholly accommodated within the area of the virtual volume.

If it is determined at Step 1040 that the request is for accessing outside the virtual volume area, the processing advances to Step 1080, and an error response is returned. Or if it is determined that the area of the virtual volume can accommodate the data, the processing goes ahead to Step 1070, where the volume is accessed.

If it is determined at Step 1030 above that the accessing method is not what is indicated by Command 1 of the specific command control information 510, the processing advances to Step 1050. At Step 1050, by using the specific command control information 510, a command of the specific command field 520 identical to the accessing method required by the VM 200 is extracted.

Then at Step 1060, following the indication of the control method matching the extracted specific command, a response is returned to the VM 200 without accessing any volume in the storage device 300.

As described so far, the volume to which a virtual volume was allocated from the VM 200 has been successfully accessed. To add, if the processing by the virtual volume driver 240 is to be executed by the adapter firmware 500 of the HBA 110, no determination is made at Step 1040 as to whether or not it is within the virtual volume, but Steps 1960 and 1970 of FIG. 9 are executed instead. Further, when the result of volume accessing has been returned from the storage device 300, if information on the volume accessing position is contained in the return data, the positional information is altered by converting it into information on the position from the leading position of the virtual volume, and the revised data are returned to the VM 200. For this conversion, too, the virtual volume information 600' in the adapter firmware 500 is used.

As described so far, in this embodiment, the virtual volume allocating unit 800 can, by using the volume management information 400, cause the virtualization mechanism to allocate a virtual volume of the size requested by the VM to a volume in the storage device and give it to the VM.

Or, when a virtual volume is to be accessed from the VM, the virtual volume driver or the adapter firmware, using the virtual volume information 600, can convert the address of the access destination on the virtual volume into an address that would serve as the access destination on the volume.

Processing in this way makes it possible to allocate a virtual disk volume of a size designated by the server manager to a virtual computer and to access from the virtual computer to the virtual disk volume without intervention by a hypervisor.

Second Embodiment

Figure 7:
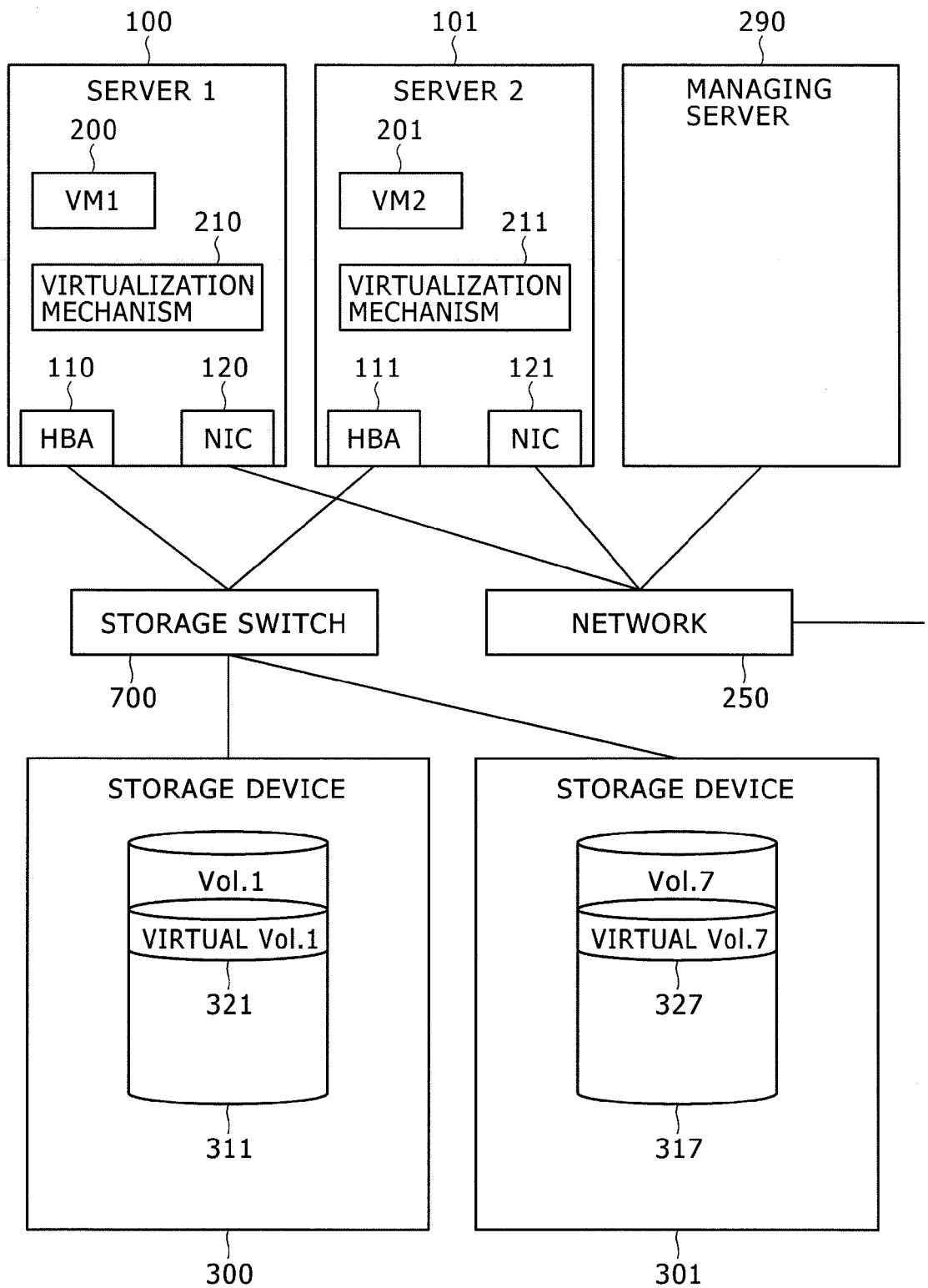
FIG. 7 shows the system configuration wherein multiple servers and storage devices are present.

Second Embodiment comprises virtualization mechanisms 210 and 211 in which multiple units of the server 100 in First Embodiment are arranged in the system configuration shown in FIG. 7 and which, when the VM 200 shifts onto another server, cause the virtual volume to be handed over to the VM which is the source of shifting to another VM which is the destination of shifting.

As shown in FIG. 1, the virtualization mechanism 210, having a VM shifting management unit 1100, has a function to shift the VM 200 to another server 101. The procedure of reallocating a virtual volume allocated to the VM 200 to the VM 201 at the destination of shifting will be described.

Figure 11:
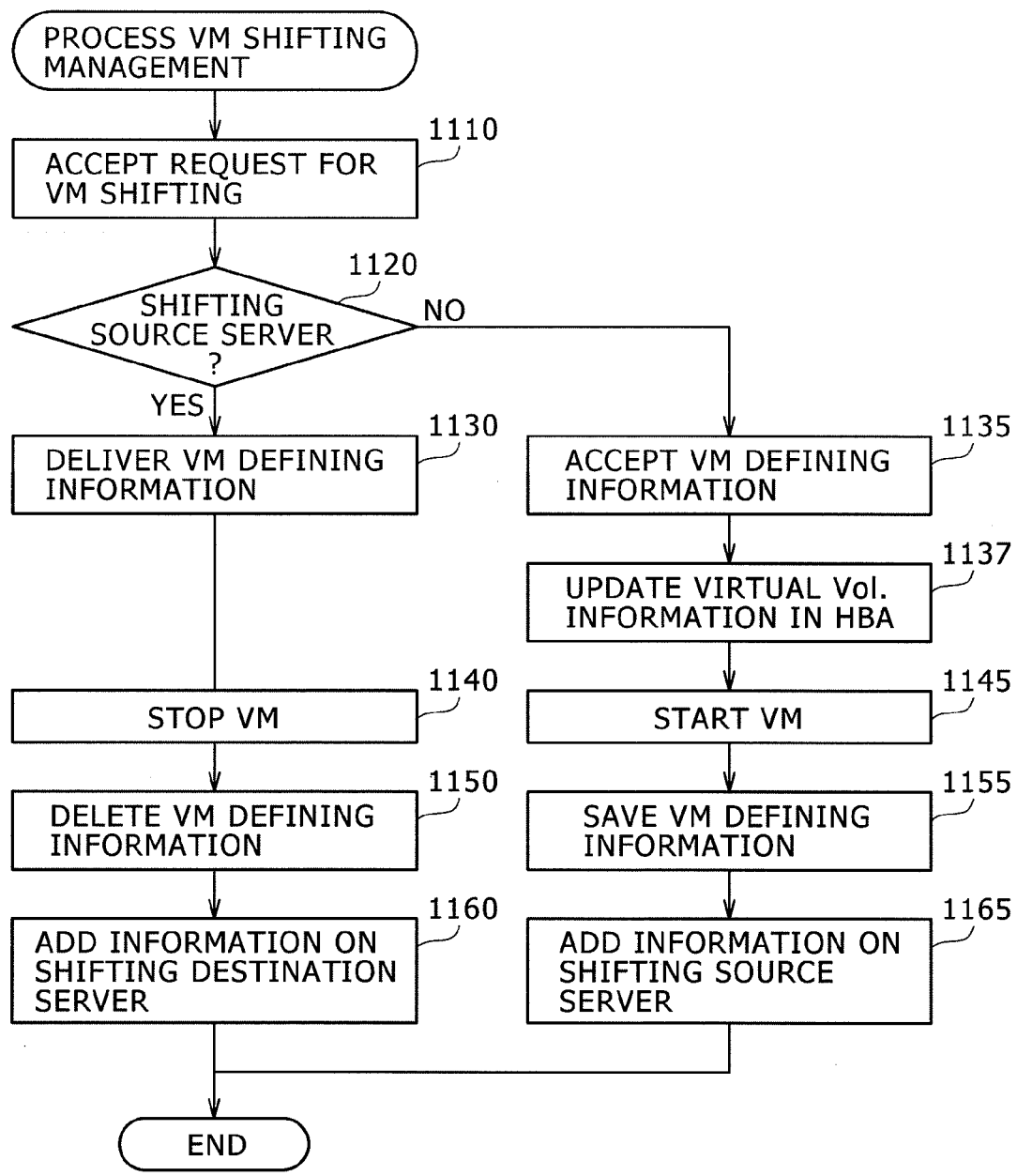
FIG. 11 shows a procedure of shifting a virtual computer to which a virtual volume is allocated to a different server.

FIG. 11 is a flow chart showing the actions of the virtualization mechanism 210 and of the virtualization mechanism 211 in collaboration with the VM shifting management unit 1100.

At Step 1110, a request for VM shifting is accepted. Here, server information of the source and the destination of shifting and information for identifying the shifting VM are acquired.

Next at Step 1120, it is determined whether or not the own acting server belongs to the source or the destination of shifting of the VM. If it is the shifting source server 100, the processing advances to Step 1130 and information 260 for defining the VM 200 is handed over to the virtualization mechanism 211 of the shifting destination server 101.

Further, the VM 200 is stopped at Step 1140, and the VM defining information 260 is deleted from the nonvolatile memory 150 at Step 1150.

Finally at Step 1160, the server information on the shifting destination of the VM to which the virtual volume was allocated is saved. The place of saving is either in the nonvolatile memory 150 or in the managing server 290.

On the other hand, if the own acting server is the shifting destination server 101, the processing goes ahead to Step 1135, and the defining information 260 for the VM 200 is received from the shifting source server 100. The VM defining information 260 received here contains the virtual volume information 600.

Then at Step 1137 that follows, the identifying information for the VM 201 and the virtual volume information 600 are handed over to the adapter firmware 500 in the HBA 111. The adapter firmware 500 saves these items of information.

Then at Step 1145, the VM 201 is started, and at Step 1155, the VM defining information 260 is saved in the nonvolatile memory 150. When the VM 201 is started, as the virtual volume driver 240 of the VM 200 is copied as it is in the VM 201, it is unnecessary to set anew the virtual volume driver 240 from the virtualization mechanism 211 before starting the VM 201. Further, the virtual volume controller 1000 of the adapter firmware 500 in the HBA 111 can perform a series of controls until the volume is accessed by using the identifying information for the VM 201 and the virtual volume information 600 stored at Step 1137.

Finally at Step 1165, the server information on the shifting destination of the VM to which the virtual volume was allocated is saved. The place of saving is either in the nonvolatile memory 150 or in the managing server 290.

To add, the stop of the shifting source VM 200 at Step 1140 and the start of the shifting destination VM 201 at Step 1145 are to be synchronized, but detailed description is dispensed with here.

As the processing in this way (especially at Steps 1135 and 1137) causes the virtual volume information 600 to be copied in the shifting destination server together with the VM defining information and the VM is started after the virtual volume information 600 is copied in the HBA as well, even if the virtual computer to which a virtual disk volume of the size designated by the VM shifting server manager was allocated is shifted onto another server, accessing is possible from the virtual computer to the virtual disk volume without requiring intervention by a hypervisor.

Third Embodiment

Third Embodiment is a virtualization mechanism 210 wherein multiple units of the storage device 300 of First Embodiment constitute the system configuration shown in FIG. 7 and which, when the virtual volume is to be shifted onto another volume, allocates the virtual volume, which is the destination of shifting, to the VM 200.

As shown in FIG. 1, the virtualization mechanism 210 has a virtual volume shifting unit 1200, which has a function to shift a virtual volume 320 into a different volume 310. The procedure of reallocating the virtual volume 320 allocated to the VM 200 to the different volume 310 will be described below.

Figure 12:
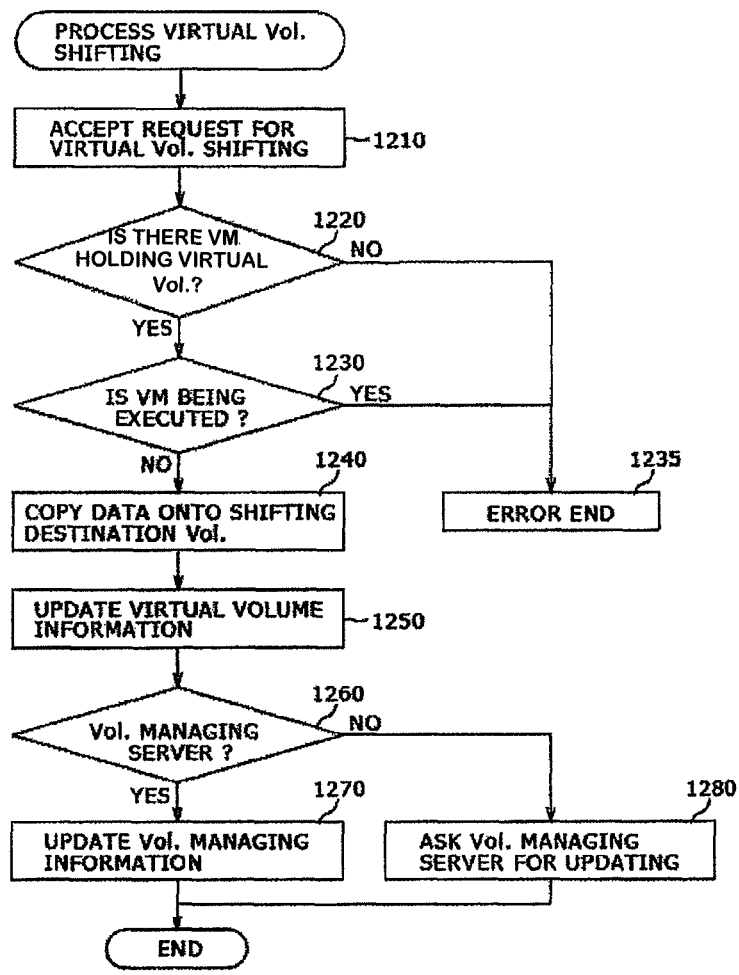
FIG. 12 is a flow chart showing a procedure of shifting a virtual volume to an area in another volume.

FIG. 12 is a flow chart showing the actions of the virtual volume shifting unit 1200 of the virtualization mechanism 210.

At Step 1210, a request for shifting a virtual volume is accepted. Here, information for identifying the shifting source virtual volume and information for identifying the shifting destination volume are acquired.

Next at Step 1220, it is determined whether or not the VM 200 to which the virtual volume to be shifted is allocated is present in the server 100. This is accomplished by checking the virtual volume information 600 of the VM defined on the server 100. If the virtual volume to be shifted is not allocated to the VM 200 in the server 100, conceivably it may be the result of its shifting to the VM 201 in the server 101 and allocation to the VM 201, but in this case error ending is supposed at Step 1235. In this case, shifting is processed by the acceptance of a shifting request by another server 101.

If the virtual volume to be shifted is allocated to the VM 200 on the server 100, the processing goes ahead to Step 1230, and it is determined whether not the VM 200 to which the virtual volume is allocated is in execution. If the VM 200 is in execution, error ending is supposed at Step 1235. In this case, shifting is processed by acceptance of a shifting request anew after the execution of the VM 200 is completed.

If the VM 200 to which the virtual volume is allocated is not in execution, the processing advances to Step 1240, where an unoccupied area in the volume 310 of the shifting destination is allocated and the data of the virtual volume 320 are copied.

Then at Step 1250, the virtual volume information 600 in the nonvolatile memory 150 is updated. Here, the storage device number field 620, the volume number field 630, the port number field 640 and the positional information field 660 corresponding to the virtual volume field 610 are updated to match the shifting destination 310. If the partitions where unoccupied areas are to be allocated differ in size from the partitions before the shifting, the size field 670 is also updated. Here, the number of partitions where unoccupied areas are to be allocated may differ from the number of partitions before the shifting. Further, if the virtual volume information 600' is held in the HBA 110, the virtual volume controller 1000 in the adapter firmware 500 is so notified, and the virtual volume information 600' in the HBA 110 is also updated.

Since the virtual volume information 600 in which a new area is registered is saved, as processing by the virtual volume information supplying unit 900 at the next time of actuating the VM 200, information on the new area in the virtual volume is transmitted to the virtual volume driver 240. In this way, when a request for accessing the virtual volume is received, positional information can be converted to represent the new area by the virtual volume driver 240.

Next at Step 1260, it is determined whether or not the server managing the volume to which the virtual volume was allocated is the own server 100. For this purpose, the server information registered in the server information field 650 of the virtual volume information 600 is compared with the own server 100.

If the volume managing server is found to be the own server 100, the processing advances to Step 1270, and the volume management information 400 is updated about before shifting volume and after shifting volume. Here, the status of use field 440, the positional information field 450 and the size field 460 are updated. In the shifting source volume, the records of the virtual volume are deleted, resulting in an increase in the size of the unoccupied area. In the shifting destination volume, information on the virtual volume is recorded, resulting in a decrease in the size of the unoccupied area.

On the other hand, if it is determined at Step 1260 that the volume managing server is not the own server 100, the processing moves ahead to Step 1280, and the virtualization mechanism 210 of the server recorded in the server information field 650 is requested to update the volume management information 400. The virtualization mechanism 210 so requested executes similar processing to Step 1270 by using information on the virtual volume received at the same time as the request.

As the processing in this way updates the virtual volume information 600 and the volume management information 400 along with the shifting of the virtual volume, even if the virtual disk volume of the size designated by the server manager is shifted to a new area on a different volume, accessing is possible from the virtual computer to the virtual disk volume without requiring intervention by a hypervisor.

Fourth Embodiment

Fourth Embodiment is a virtualization mechanism 210 in which the VM having allocated a virtual volume cancels the allocation of the virtual volume and returns the virtual volume allocation area on the volume to an unoccupied area.

As shown in FIG. 1, the virtualization mechanism 210, having a virtual volume canceling unit 1300, has a function to cancel the allocation of the virtual volume 320 to the VM 200. The procedure of releasing the virtual volume 320 from the allocation of to the VM 200 will be described below.

Figure 13:
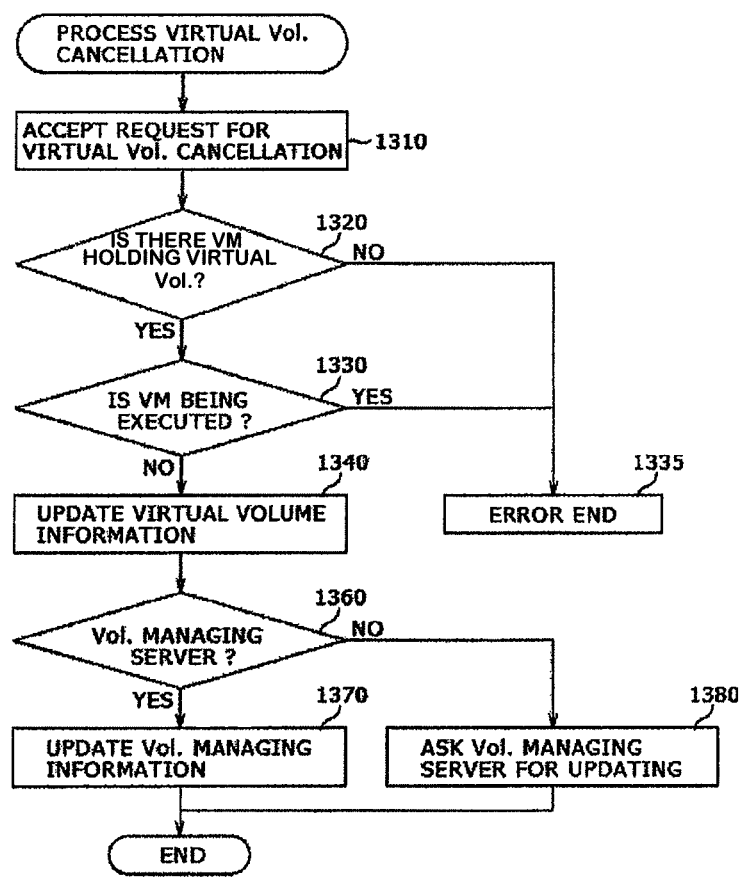
FIG. 13 is a flow chart showing a procedure of canceling the allocation of the virtual volume to the virtual computer.

FIG. 13 is a flow chart showing the actions of the virtual volume canceling unit 1300 of the virtualization mechanism 210.

At Step 1310, a request for virtual volume cancellation is accepted. Here, virtual volume identifying information is acquired.

Next at Step 1320, it is determined whether or not the VM 200 to which the virtual volume to be released is allocated is present in the server 100. This is accomplished by checking the virtual volume information 600 of the VM defined on the server 100. If the virtual volume to be shifted is not allocated to the VM 200 in the server 100, conceivably it may be the result of its shifting to the VM 201 in the server 101 and allocation to the VM 201, but in this case error ending is supposed at Step 1335. In this case, cancelation is processed by having another server 101 accept the request for cancellation.

If the virtual volume to be released is allocated to the VM 200 on the server 100, the processing advances to Step 1330, where it is determined whether or not the VM 200 to which the virtual volume is allocated is in execution. If the VM 200 is in execution, error ending is supposed at Step 1335. In this case, cancellation is processed by the acceptance of a cancellation request anew after the execution of the VM 200 is completed.

If the VM 200 to which the virtual volume is allocated is not in execution, the processing goes ahead to Step 1340, and the virtual volume information matching the virtual volume information 600 in the nonvolatile memory 150 is deleted. Or if the virtual volume information 600 is provided in the HBA 110, the virtual volume controller 1000 in the adapter firmware 500 is so notified, and the virtual volume information 600 in the HBA 110 is also updated.

As the virtual volume information 600 from which designated virtual volume information has been deleted is saved in this way, the virtual volume information supplying unit 900 does not transmit information on the deleted virtual volume to the virtual volume driver 240 at the next time of actuating the VM 200. In this way, the virtual volume driver 240 is prevented from accepting any request for accessing the deleted virtual volume.

At Step 1360, it is determined whether or not the server managing the volume to which the virtual volume was allocated is the own server 100. For this purpose, the server information registered in the server information field 650 of the virtual volume information 600 is compared with the own server 100.

If the volume managing server is found to be the own server 100, the processing advances to Step 1370, and the volume management information 400 is updated. Here, the status of use field 440, the positional information field 450 and the size field 460 are updated about the volume to which the area of the virtual volume is allocated. Namely, the records of the virtual volume are deleted, resulting in an increase in the size of the unoccupied area.

On the other hand, if it is determined at Step 1360 that the volume managing server is not the own server 100, the processing moves ahead to Step 1380, and the virtualization mechanism 210 of the server recorded in the server information field 650 is requested to update the volume management information 400. The virtualization mechanism 210 so requested executes similar processing to Step 1370 by using information on the virtual volume received at the same time as the request.

As the processing in this way updates the virtual volume information 600 and the volume management information 400 along with the releasing of the virtual volume, after the cancellation of the allocation of the virtual disk volume of the size designated by the server manager, accessing can be refused by the virtual computer to the virtual disk volume without requiring intervention by a hypervisor.

Although the invention achieved by the present inventor has been hitherto described in specific terms with reference to embodiments thereof, the invention is not limited to these embodiments, but obviously it can be altered in various ways without deviating from the essentials thereof.

What is claimed is:

1. A computer system comprising a computer and a storage device connected to the computer, wherein:

the storage device has a volume for storing data of the computer and virtual volumes formed by logically dividing the volume;

the computer has an arithmetic unit, a memory unit, a virtual computer operating on the arithmetic unit which is controlled by a virtualization mechanism, and volume management information for managing a status of use of the virtual volume and positional information on the virtual volume;

the virtualization mechanism has a virtual volume allocating unit that allocates a new virtual volume to the virtual computer when a request for virtual volume allocation is received;

the memory unit has virtual volume information for managing virtual volumes allocated to the virtual computer; and the virtual volume allocating unit
references the volume management information and searches for any unused area in the volume,
allocates a new virtual volume to an unused area in the volume if the unused area of the volume satisfies a size requirement for the virtual volume designated by the request for virtual volume allocation,
updates the status of use of the virtual volume and positional information on the virtual volume that the volume management information has to a state after the allocation of the new virtual volume, and
adds information on the new virtual volume to the virtual volume information.

2. The computer system according to claim 1, wherein the virtual volume allocating unit allocates no new virtual volume to the virtual computer if the unused area of the volume not satisfy the size requirement for the virtual volume designated by the request for virtual volume allocation.

3. The computer system according to claim 1, wherein the virtualization mechanism references volume information in the storage device and generates the volume management information in the memory unit.

4. The computer system according to claim 1, wherein the volume in the storage device is a physical volume or a logical volume.

5. The computer system according to claim 1,
wherein the computer has a virtual volume driver for accessing the virtual volume from the virtual computer, and
wherein the virtual volume driver is caused by the reception of a request for accessing the virtual volume to:
acquire an access address contained in the request for accessing the virtual volume; and
converts the acquired access address into an address in the volume of the virtual volume to be accessed.

6. The computer system according to claim 5,
wherein the virtual computer has a virtual Host Bus Adapter (HBA),
wherein the computer has a HBA,
wherein the virtual volume information that the memory unit has includes positional information on the virtual volume and a virtual World Wide Name (WWN) allocated to the virtual HBA to access the virtual volume,
wherein the virtualization mechanism has a virtual volume information supplying unit that is caused by the reception of a request for supply of virtual volume information to transmit the virtual volume information to the virtual volume driver,
wherein the virtual volume information supplying unit:
references the memory unit and acquires the virtual volume information; and transmits the acquired virtual volume information to the virtual volume driver, and wherein the virtual volume driver:
extracts from the received virtual volume information the positional information on the virtual volume;
extracts from the received virtual volume information the virtual WWN corresponding to the virtual volume;
specifies the virtual HBA to which the extracted virtual WWN is allocated; and
holds the specified virtual HBA and the virtual volume matched with each other as destination information for addressing an access request to the virtual volume.

7. The computer system according to claim 5, wherein the virtual volume driver accesses the volume of the storage device on the basis of the converted address.

8. The computer system according to claim 5, wherein the virtual volume driver is contained in the virtual computer or HBA.

9. The computer system according to claim 6, wherein:
The virtualization mechanism holds the virtual volume information, together with information for defining the virtual computer to which the virtual volume is allocated, in the memory unit.

10. The computer system according to claim 9,
wherein computer information for managing the volume having a virtual volume area is held in the virtual volume information, and
wherein, when the virtual computer shifts onto a different computer, information on the virtual volume, together with information for defining the virtual computer, shifts to a different computer.

11. The computer system according to claim 9,
wherein computer information for managing the volume having a virtual volume area is held in the virtual volume information, and
wherein when the virtual volume shifts to a different volume area, information indicating the volume having a virtual volume area within the virtual volume information is altered to information on the shifting destination volume.

12. The computer system according to claim 9, wherein the virtual volume information, stored together with information for defining the virtual computer, is deleted when the allocation of virtual volumes from the virtual computer is canceled.

13. A method of allocating volumes for a virtual computer in a computer system comprising a computer having a virtual computer operating on an arithmetic unit which is controlled by a virtualization mechanism and a storage device connected to the computer,
wherein the storage device has a volume for storing data of the computer and virtual volumes formed by logically dividing the volume,
wherein the computer has the arithmetic unit, a memory unit, the virtualization mechanism, the virtual computer, and volume management information for managing a status of use of the virtual volume and positional information on the virtual volume,
wherein the virtualization mechanism has a virtual volume allocating unit that allocates a new virtual volume to the virtual computer when a request for virtual volume allocation is received,
wherein the memory unit has virtual volume information for managing virtual volumes allocated to the virtual computer, and
wherein the virtual volume allocating unit:
references the volume management information and searches for any unused area in the volume;
allocates a new virtual volume to an unused area in the volume if the unused area of the volume satisfies a size requirement for the virtual volume designated by the request for virtual volume allocation;
updates the status of use of the virtual volume and positional information on the virtual volume that the volume management information has to a state after the allocation of the new virtual volume; and
adds information on the new virtual volume to the virtual volume information.

14. The method of allocating volumes for a virtual computer according to claim 13, wherein the virtual volume allocating unit allocates no new virtual volume to the virtual computer if the unused area of the volume not satisfy the size requirement for the virtual volume designated by the request for virtual volume allocation.

15. The method of allocating volumes for a virtual computer according to claim 13, wherein the virtualization mechanism references volume information in the storage device and generates the volume management information in the memory unit.

16. The method of allocating volumes for a virtual computer according to claim 13, wherein the volume in the storage device is a physical volume or a logical volume.

17. The method of allocating volumes for a virtual computer according to claim 13,
wherein the computer has a virtual volume driver for accessing the virtual volume from the virtual computer, and
wherein the virtual volume driver is caused by the reception of a request for accessing the virtual volume to:
acquire an access address contained in the request for accessing the virtual volume, and
converts the acquired access address into an address in the volume of the virtual volume to be accessed.

18. The method of allocating volumes for a virtual computer according to claim 17,
wherein the virtual computer has a virtual Host Bus Adapter (HBA);
wherein the computer has a HBA;
wherein the virtual volume information that the memory unit has includes positional information on the virtual volume and a virtual World Wide Name (WWN) allocated to the virtual HBA to access the virtual volume;
wherein the virtualization mechanism has a virtual volume information supplying unit that is caused by the reception of a request for supply of virtual volume information to transmit the virtual volume information to the virtual volume driver;
wherein the virtual volume information supplying unit:
references the memory unit and acquires the virtual volume information; and
transmits the acquired virtual volume information to the virtual volume driver, and
wherein the virtual volume driver:
extracts from the received virtual volume information the positional information on the virtual volume;
extracts from the received virtual volume information the virtual WWN corresponding to the virtual volume;
specifies the virtual HBA to which the extracted virtual WWN is allocated; and
holds the specified virtual HBA and the virtual volume matched with each other as destination information for addressing an access request to the virtual volume.

19. The method of allocating volumes for a virtual computer according to claim 17, wherein the virtual volume driver accesses the volume of the storage device on the basis of the converted address.

20. The method of allocating volumes for a virtual computer according to claim 17, wherein the virtual volume driver is contained in the virtual computer or HBA.

* * * * *